United States Patent [19]

Gover et al.

[11] Patent Number: 4,779,277
[45] Date of Patent: Oct. 18, 1988

[54] FREE ELECTRON LASER INJECTION OSCILLATOR

[75] Inventors: Avraham Gover, Tel Aviv, Israel; Steven H. Gold, New Carrollton; Victor L. Granatstein, Silver Spring, both of Md.

[73] Assignee: The United States of America as represented by the Secretary of the Navy, Washington, D.C.

[21] Appl. No.: 473,411

[22] Filed: Mar. 9, 1983

[51] Int. Cl.$^4$ ............................................. H01S 1/00
[52] U.S. Cl. ....................................................... 372/2
[58] Field of Search .......................... 372/2, 94, 12, 27

[56] References Cited

U.S. PATENT DOCUMENTS

| | | | |
|---|---|---|---|
| 3,398,376 | 8/1968 | Hirshfield | 330/4.3 |
| 3,467,914 | 9/1969 | Muller | 331/94.5 |
| 3,582,817 | 6/1971 | Gilson | 331/94.5 |
| 3,822,410 | 7/1974 | Madey | 331/94.5 |
| 3,879,679 | 4/1975 | Mourier | 331/94.5 N |
| 3,958,189 | 1/1977 | Sprangle et al. | 331/94.5 |
| 4,019,157 | 4/1977 | Hutchinson et al. | 331/94.5 C |
| 4,189,686 | 2/1982 | Brau et al. | 331/94.5 |
| 4,224,576 | 9/1980 | Granatstein et al. | 330/4 |
| 4,227,159 | 10/1980 | Barrett et al. | 331/94.5 P |
| 4,283,687 | 8/1981 | Madey | 331/94.5 |
| 4,314,210 | 2/1982 | Everett | 372/18 |
| 4,320,359 | 3/1982 | Peterson et al. | 372/18 |
| 4,323,857 | 4/1982 | Brau et al. | 372/2 |

OTHER PUBLICATIONS

Blewett et al.; IEEE Transactions on Nuclear Science; "Free Electron laser Experiment at the NSLS 700 MeV Electron Storage Ring"; vol. NS-8, No. 3, pp. 3166–3168; Jun. 1981.

Deacon, Elias, Madey, Ramian, Schwettman, and Smith; "First Operation of a Free-Electron Laser"; Physical Review Letters, vol. 38, No. 16, Apr. 18, 1977, pp. 892–894.

*Primary Examiner*—William L. Sikes
*Assistant Examiner*—Robert E. Wise
*Attorney, Agent, or Firm*—Thomas E. McDonnell; John L. Forrest

[57] ABSTRACT

A free electron laser for use with a short-pulse relativistic electron source. The device includes a resonant optical cavity in which a spatially-periodic magnetic field is produced by a wiggle magnet assembly. An input optical beam having a wavelength lying within the gate bandwidth of the free electron laser interaction is injected into the cavity. A beam of relativistic electrons produced by a short-pulse source, such as an RF-linac, is injected into the cavity. The electron beam and the input optical beam interact under the influence of the magnetic field to amplify the input optical beam.

24 Claims, 4 Drawing Sheets

⊗ = Vector Pointed Into Page
⊙ = Vector Pointed Out of Page 4,779,277

FREE ELECTRON LASER INJECTION OSCILLATOR

BACKGROUND OF THE INVENTION

A free electron laser oscillator which utilizes laser injection to stimulate the growth of an output beam.

Infrared free electron laser oscillators in the Compton, or low density, high voltage regime are regenerative devices which require a very long time (about 100 microseconds) to achieve a high power output due to the requirement that the signal grow out of electron beam noise. This has been successfully demonstrated at a wavelength of 3 $\mu$m using a very long electron beam pulse (1000 microseconds) from a superconducting linac electron source. Additionally, storage ring free electron lasers can, in principle, provide the very long time-duration electron beam current required for an infrared free electron laser oscillator output to grow out of noise, although this has not yet been demonstrated.

Conventional short-pulse (approximately 1 $\mu$sec) electron sources, such as the RF-linac, have definite advantages over both the superconducting linac and the storage ring laser system in cost, convenience, and compactness. However, these short pulse sources generally have too short a macropulse output for the oscillator output to grow out of the beam noise.

The present Invention provides a novel free electron laser oscillator which is capable of producing an output beam when supplied with an input electron beam from a conventional short-pulse electron source.

SUMMARY OF THE INVENTION

Accordingly, one object of the present Invention is to provide a novel free electron laser.

Another object is to provide a novel free electron laser which utilizes a conventional short-pulse electron beam source.

Still another object is to provide a novel high-power infrared source which is both tunable and coherent.

These and other objectives and advantages are achieved by a novel free electron laser according to the present Invention which includes a resonant optical cavity. A spatially-periodic magnetic field is provided in the cavity by a wiggler magnet. Means are provided for injecting a beam of relativistic electrons into the cavity and means are provided for injecting an input optical beam into the cavity. The input optical beam has a wavelength lying within the gain bandwidth of the free electron laser interaction. The input optical beam and the electron beam interact under the influence of the magnetic field to amplify the input optical beam.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
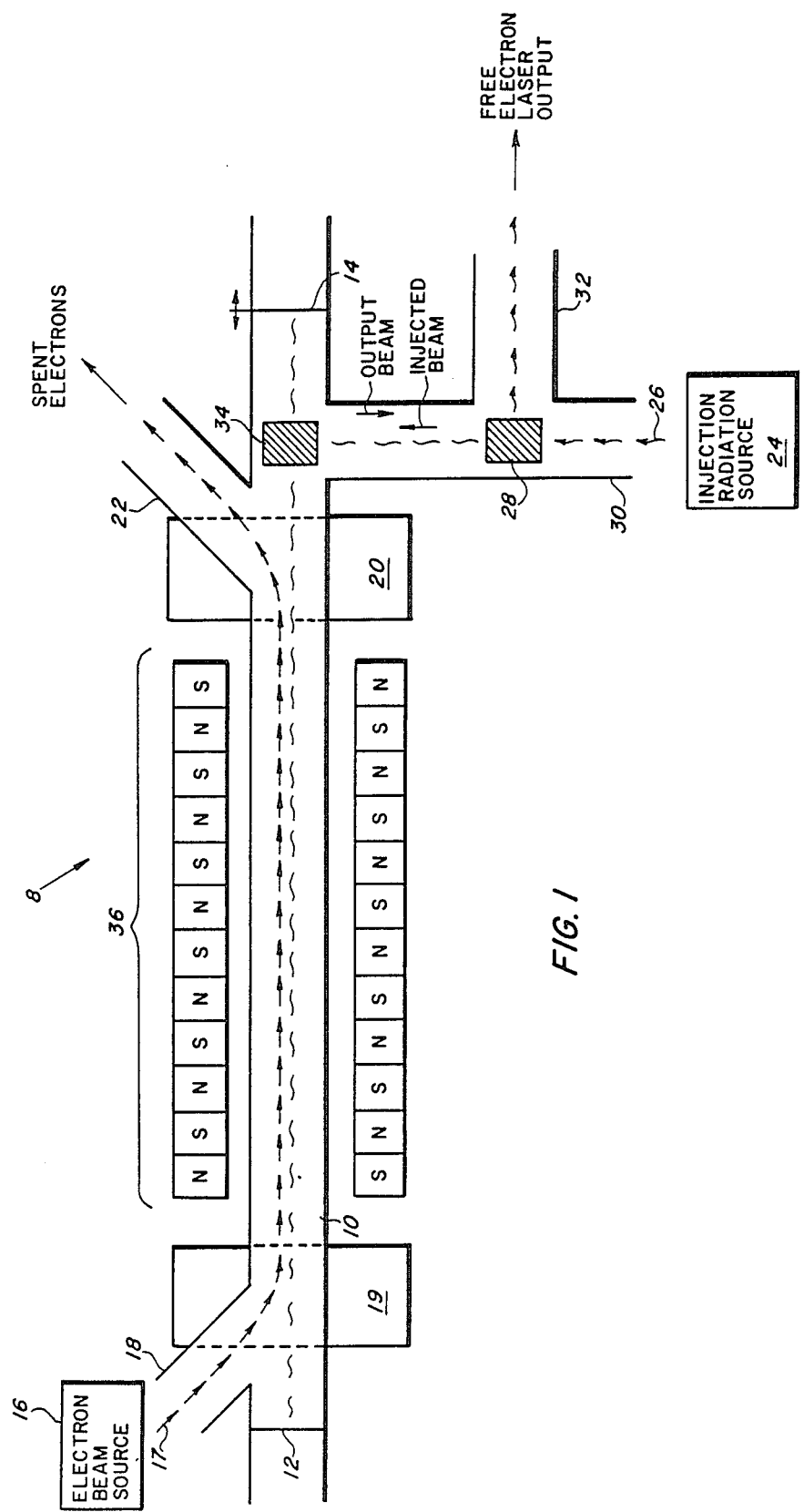
FIG. 1 illustrates a first preferred embodiment of the present invention.

Referring now to the drawings, wherein like reference numerals designate identical or corresponding parts throughout the several views, and more particularly to FIG. 1 thereof, a schematic illustration of a free electron laser 8 according to the present Invention is presented.

In FIG. 1, a cavity 10 includes a fixed mirror 12 and an adjustable mirror 14 configured to form a stable resonator. The fixed mirror and the adjustable mirror 14 are standard laser quality mirrors. The adjustable mirror 14 is suitably mounted for axial adjustment in the cavity 10 in a well-known manner.

An electron beam source 16, such as a conventional short-pulse electron accelerator or an RF-linac, periodically supplies a beam of relatavistic energy level electrons 17 in the form of "macropulses". The electron beam 17 travels through an entry passage 18 and is subsequently bent by a bending magnet 19 to axially propagate within the cavity 10. The axially propagating electron beam 17 gives up energy to the free-electron interaction within the cavity 10 during its passage through the cavity, as will be further described below. After traversing the cavity 10, the electron beam 17 is deflected by a bending magnet 20 and leaves the cavity 10 by way of an exit passage 22. The spent electrons leaving via exit passage 22 are absorbed by an appropriate shielded heat sink (not illustrated) or the equivalent in a well-known manner. Although only one magnet is illustrated for each of the bending magnets 19 and 20, it should be understood that each magnet includes a portion on each side of the cavity 10 in a configuration well known in the art. Other equivalent electron deflecting means can also be utilized as is known in the art.

An injection radiation source 24 supplies a low-power polarized injection beam of radiation 26 having a suitable wavelength lying within the gain bandwidth of the free electron interaction. The injection beam 26 may be coherent or incoherent. For example, a solid state lead salt laser is a suitable source for use with a free electron laser operating in the range of 15 to 30 microns. The source 24 may be of a type which produces an inherently polarized beam of radiation or, alternatively, an unpolarized beam from the source may be subsequently polarized in any well-known manner. The injection beam 26 may be in any state of polarization appropriate to the optical cavity and to the magnetic field within the cavity (to be described below); however, for purposes of the following discussion, the beam will be assumed to be horizontally polarized.

The horizontally polarized injection beam 26 is directed onto a first electro-optical polarization rotator and polarization analyzer 28, located at the intersection of an injection passage 30 and an output passage 32, which is in its de-energized state. The injection beam 26 is thus transmitted without changing its state of polarization. After passing through the first polarization rotator and analyser 28, the injection beam 26 is directed onto a second electro-optical polarization rotator and analyser 34, which is located at the intersection of the injection passage 30 and the cavity 10. The second polarization rotator and analyser 34 is in its energized state and thus rotates the state of polarization of the injection beam 26 from horizontal to vertical and deflects the injection beam 26 to propagate axially within the cavity 10. The first and second polarization rotators and analysers 28 and 34 may be formed from a polarization rotator, such as a Pockels cell or Kerr cell, which rotates the state of polarization in response to an electrical signal, combined with a polarization analyser, such as a Brewster stack of plates or a polarizing prism such as a Wollaston prism, which transmits radiation in particular states of polarization and deflects radiation in other particular states of polarization. Specific embodiments of the first and second polarization rotators and analyzers 28 and 34 will be described in further detail below.

After the now vertically polarized injection beam 26 is injected into the cavity 10, the second polarization rotator and analyser 34 is de-energized such that vertically polarized radiation is no longer deflected. The cavity 10 is thus closed to the entry and exit of radiation.

The injection beam 26 travels axially up and down the cavity 10, being reflected at each end by the mirrors 12 and 14. The position of the adjustable mirror 14 is adjusted such that photons from the injection beam 26 arrive simultaneously with the entry of micropulses of electrons in the electron beam 18 into the cavity 10.

A wiggler magnet assembly 36 is coaxially positioned about the exterior of the cavity 10 to produce a spatially-periodic transverse magnetic field within the cavity 10. The beam-wave interaction takes place between the electron beam 17 and the injection beam 26 in the presence of the transverse wiggler magnetic field to effectively amplify the injection beam by means of the free electron laser process.

It should be noted that the particular orientation of the wiggler magnet assembly 36 shown in FIG. 1 is merely for purposes of illustration and that in actuality the magnet must be axially rotated with respect to the cavity 10 to properly orient the direction of the magnetic field with respect to the state of polarization of the injection beam 26 so as to effect amplification of the injection beam. In particular, the wiggler magnet assembly 36 should be oriented such that its magnetic field vectors are directed normal to the polarization vector of the injection beam 26. Also, other wiggler magnet configurations may be used, as should be apparent to the skilled practitioner. The wiggler magnet assembly 36 may be made up of various permanent magnets or electro-magnets as is well known in the art.

At the end of the macropulse of the electron beam 17, the second polarization rotator and analyzer 34 is energized to rotate the state of polarization of radiation incident thereon (developed within the cavity 10) from vertical to horizontal and to deflect the now horizontally polarized beam out of the cavity 10 into the injection passage 30. Simultaneously, the first polarization rotator and analyzer 28 is energized to rotate the state of polarization of the horizontally polarized beam deflected into the injection passage 30 from horizontal to vertical thereby causing the resultant vertically polarized beam to be deflected into the output passage 32 to form the output of the free electron laser 8. The entire operation may then be repeated to produce free electron laser interactions with subsequent macropulses of the electron beam 17.

Figure 2:
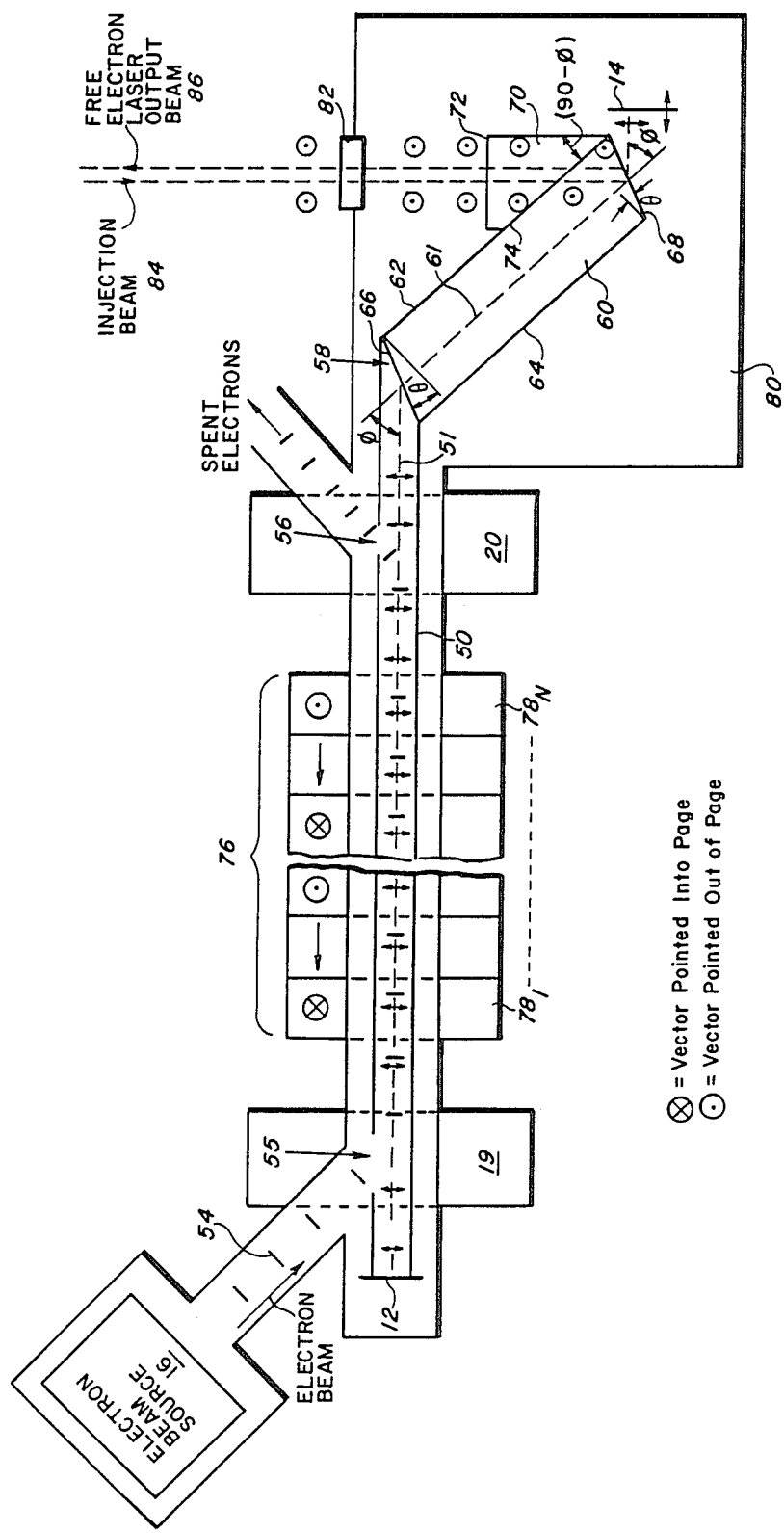
FIG. 2 illustrates in greater detail the preferred embodiment shown in FIG. 1.

FIG. 2 illustrates in greater detail the free electron laser according to the present Invention which was described above with reference to FIG. 1. In FIG. 2, a cavity forming a stable resonator is generally defined by a metallic waveguide 50, a fixed mirror 12, and an adjustable mirror 14. The metallic waveguide 50 may be made from any suitable waveguide material, such as copper. The fixed mirror 12 and the adjustable mirror 14 are standard laser quality mirrors as described above with respect to FIG. 1.

A short pulse electron beam source 16, such as an RF-linac or other electron accelerator, periodically supplies a relativistic beam of macropulses of electrons 54 which is deflected by a bending magnet 19 and enters the waveguide 50 through an opening 55 in one wall of the waveguide to axially propagate within the waveguide 50. After giving up energy to the free electron laser interaction, the spent electron beam 54 is deflected by a bending magnet 20 and exits the waveguide through an opening 56 in one wall of the waveguide 50. The bending magnets 19 and 20 are as described above with respect to FIG. 1.

Located between the open end 58 of the waveguide 50 and the adjustable mirror 14 is a Pockels cell polarization rotator 60. The ends of the Pockels cell 60 are each cut at an angle of $(90+\theta)°$ with respect to the longitudinal sides 62 and 64 of the cell 60 where $\theta$ equals $(90-\theta_B)°$, and $\theta_B$ is the Brewster angle for the cell 60. The cell 60 is appropriately oriented between the waveguide 50 and the adjustable mirror 14 such that the angle $\theta$ between the longitudinal axis 61 of the cell 60 and the longitudinal axis 51 of the waveguide 50 is equal to $(2\theta_B-90)°$. The resultant surfaces 66 and 68 thus form Brewster surfaces which act as polarization analyzers integral with the Pockels cell polarization rotator 60; that is, the light in the optical cavity strikes the Pockels cell at the Brewster angle to the normal of the Pockels cell ends.

The length of the Pockels cell 60 must be sufficient to cause an appropriate rotation of the state of polarization (e.g. 90°) of incident light rays traveling along the longitudinal axis 61 of the cell within the maximum control voltage limits of the Pockels cell. For use in the range of 15 to 30 microns, the Pockels cell is preferably formed of a single crystal of CdTe having a length of 5 cm and a Brewster angle $\theta_B$ of 67.18° at 16 μm. The angles $\theta$ were set equal to $(90-\theta_B)°$ or 20.82°. The angle $\theta = (2\theta_B-90)°$ was 48.36. The Pockels cell 60 may be energized in any well known manner, such as by means of ring electrodes, transverse elctrodes, etc.

Radiant energy in the form of light beams enters and exits the Pockels cell 60 through a coupling prism 70 including an end surface 72 oriented perpendicular to the path of the light beams so as to prevent undesirable reflections therefrom. The opposite end of the prism 70 is cut at an angle of $(90-\theta)°$ to form a coupling surface 74 which contacts the longitudinal side surface 62 of the Pockels cell 60. In order to prevent reflections at the interface between the coupling surface 74 and the longitudinal side surface 62, the prism 70 should have the same refractive index as that of the cell 60. For example, an amorphous CdTe prism should be used with a crystal CdTe Pockels cell. Additionally, the prism 70 should be located so as to minimize the light path within the Pockels cell 60 between the coupling surface 74 and the Brewster surface 68 such that polarization rotation due to the action of the Pockels cell is minimized along this path.

Figure 3:
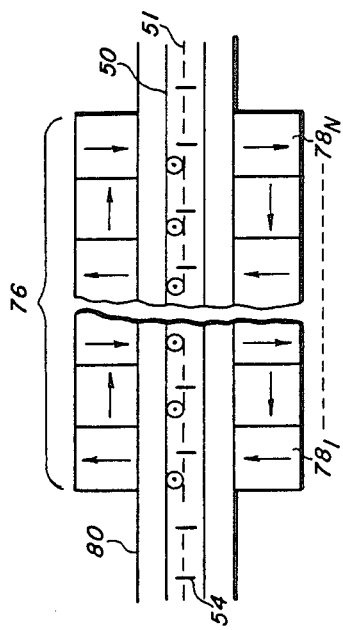
FIG. 3 is a partial top view of the preferred embodiment of FIG. 2 illustrating the configuration of the wiggler magnet assembly.

A spatially-periodic transverse magnetic field is created within the waveguide 50 by means of wiggler magnet assembly 76 positioned coaxially with respect to the waveguide 50. The wiggler magnet assembly 76 is formed from a plurality of individual magnet structures $78_1$ through $78_N$ which may be either pairs of permanent-type magnets or electro-magnets, as is well known in the art. The magnetic field vectors of the individual magnet structures $78_1$ through $78_N$, may be oriented as shown and described above with respect to FIG. 1. However, to improve the gain of the free electron laser interaction, they are preferably oriented as shown in FIG. 2. Further, in FIG. 2, the magnetic field vectors are shown in their correct orientation for amplification with respect to the light polarization mode illustrated. FIG. 3 is a partial top cross-sectional view of the wiggler magnet assembly 26 illustrating the correct magnetic field orientations for the top layer of the pairs of magnets making up the individual magnet structures $78_1$ through $78_N$ when viewed from above.

The above described structure are housed within a vacuum vessel 80. Input and output radiation is transmitted through a appropriate vacuum window 82. The bending magnets 19 and 20 and the wiggler magnet assembly 76 may be located inside or outside the vacuum vessel 80, according to standard practices in the art.

In operation, the Pockels cell 60 is energized and a polarized injection beam of light 84 is directed through the vcacuum window 82 and the coupling prism 70 into the Pockets cell 60 where it strikes the Brewster surface 68. The injection beam 84 is polarized (perpendicular to the plane of FIG. 2) such that its polarization vector is perpendicular to the plane of incidence when it strikes the Brewster surface 68. Being polarized perpendicular to the plane of incidence, a fraction of the injection beam 84 is reflected by the Brewster surface 68 to propragate along the longitudinal axis 61 of the Pockels cell 60. Since the Pockels cell 60 is energized, the state of polarization of the injection beam 84 is rotated by 90° as it traverses the cell. The rotated injection beam 84 thus strikes the Brewster surface 66 with its polarization vector in parallel with the plane of incidence (parallel to plane of FIG. 2) and is therefore refracted by that surface to propagate along the longitudinal axis 51 of the waveguide 50.

After the injection beam 84 enters the waveguide 50, the Pockels cell 60 is de-energized. The injection beam 84 travels along the length of the waveguide 50 to the fixed mirror 12 where it is reflected back to the Brewster surface 66. Being polarized parallel to the plane of incidence, the injection beam 84 is refracted and propagates along the axis of the cell ultimately striking the Brewster surface 68. No polarization rotation occurs because the cell is de-energized. Thus, the beam is refracted by the surface 68 and is directed to the adjustable mirror 14 which reflects the beam back through the cell to the fixed mirror 12, and so forth. Thus de-energizing the Pockels cell 60 causes the cavity to become closed.

When the injection beam has entered the cavity and the Pockels cell 60 has been de-energized, the electron beam source 16 is energized and the electron beam 54 is directed into the cavity through the opening 55. The position of the adjustable mirror 14 is adjusted such that the injected electrons 54 and the photons of the injection beam 84 travel together through the cavity and are subjected to the spatially-periodic transverse magnetic field supplied by the wiggler magnet assembly 76, wherein the free electron laser beam-wave interaction takes place causing the injection beam to be amplified in the same polarization mode as that of the injection beam. Because the polarization mode of the amplified beam is unchanged from that of the injection beam and because the Pockels cell 60 is de-energized, the amplified beam resonates within the cavity, being reflected by the mirrors 12 and 14.

When the macropulse of electrons from the source 16 ends, the Pockels cell 60 is again energized to reopen the cavity. The amplified beam enters the cell through the surface 66 and its polarization vector is rotated by 90° as it traverses the cell, arriving at the surface 68 normal to the plane of incidence. The amplified beam is thus reflected by the Brewster surface 68 and passes through the coupling prism 70 and the vacuum window 82 to form the output beam 86. When the output beam 86 has left the cavity, another injection beam 84 may be injected into the cavity as described above and the amplification process may be repeated.

Figure 4:
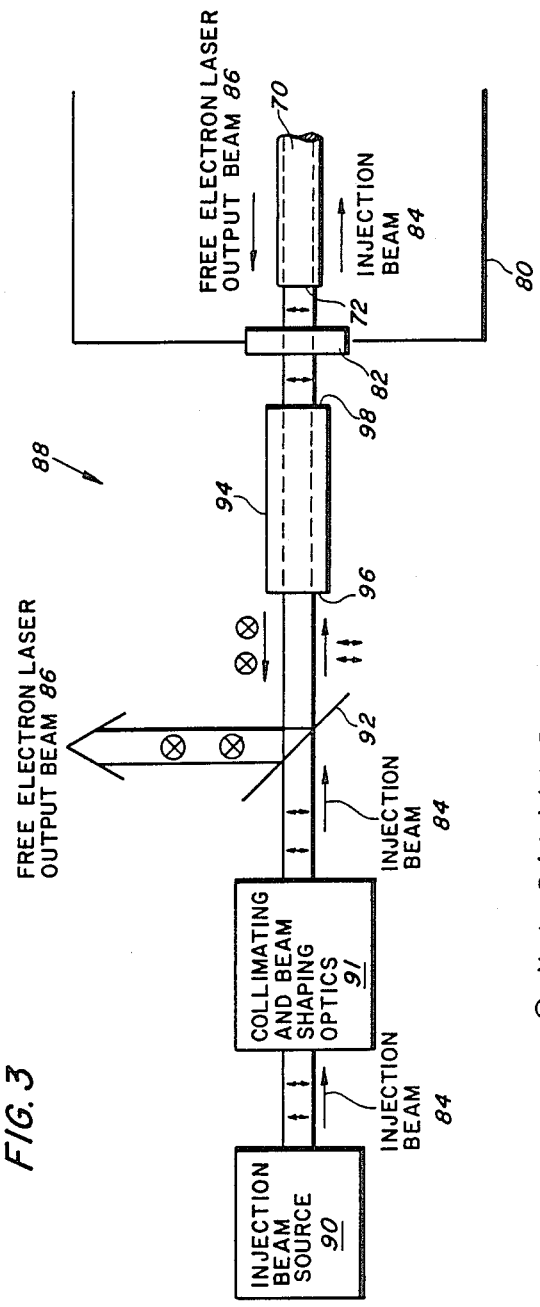
FIG. 4 illustrates a preferred embodiment of an input/output system for use with the preferred embodiment shown in FIG. 2.

Since the injection beam 84 and the output beam 86 follow the same optical path into and out of the coupling prism 70, a means must be provided for separating the output beam path from that of the injection beam so that the source of the injection beam 84 will not be damaged. FIG. 4 illustratres a preferred embodiment of an input/output system 88 for separating the optical paths of the injection beam 84 and the output beam 86.

In order to more clearly illustrate the input/output system 88 of FIG. 4, FIG. 4 has been drawn in a plane normal to the plane of FIG. 2. Thus, in FIG. 4, an injection beam source 90, which may be a coherent or incoherent source, supplies a polarized beam (polarization vector in the plane of FIG. 4 and normal to the plane of FIG. 2) to an assembly of collimating and beam shaping optics 91 which shapes the cross-section of the beam to correspond to the shape of the normal end surface 72 of the coupling prism 70, in a manner well-known in the art. The shaped injection beam 84 is incident upon a polarization analyser, such as a Brewster stack 92, in a plane of incidence normal to the polarization vector of the beam 84 and, thus, the beam 84 is transmitted by the Brewster stack 92. The transmitted beam 84 then passes through a de-energized Pockels cell 94 and the vacuum window 82 to arrive at the normal end surface 72 of the coupling prism 70, after which it enters the free electron laser cavity as described above with respect to FIG. 2.

After the injection beam 84 has enetered the cavity, the Pockels cell 94 is energized. Any portions of the injection beam passing through the energized cell will be rotated in polarization and will be injected into the free electron laser cavity at other than the desired mode. Because the free electron beam-wave interaction is polarization sensitive, these injected photons will not interact and thus will have no effect on the operation of the laser.

The output beam 86, having its polarization vector in the same plane as that of the injection beam 84 (parallel to the plane of FIG. 4), leaves the coupling prism 70 and arrives at the Pockels cell 94 after passing through the vacuum window 82. Because the cell 94 is energized, the polarization vector of the ouput beam 86 is rotated by 90° as it passes through the cell 94 and arrives at the Brewster stack 92 polarized parallel to the plane of incidence. The output beam 86 is thus reflected by the Brewster stack 92 and is directed away from the optical path of the injection beam 84. The output beam 86 may then be directed to its ultimate destination.

The Pockels cell 94 may be constructed in any well-known manner. The cell should be sufficiently long so as to rotate the polarization vector of incident light beam by 90° without exceeding the maximum voltage limits of the cell material. The cell may be energized in any well-known manner, such as by coupling rings or transverse electrodes. As shown, the cell 94 has end surfaces 96 and 98 normal to the optical path. As an alternative, the surface 96 could be cut to form a Brewster surface in order to eliminate the Brewster stack 92. However, the separate Brewster stack is preferred because of its superior light refecting properties. For use in the range of 15 to 30 microns, the cell 94 is preferably made from a single crystal of CdTe. In a practical embodiment, the cell had a cross-section of 2.5 mm by 2.5 mm, and a length of 60 mm.

Alternatively, the Brewster stack 92 and the Pockels cell 94 could be replaced by a rotating mirror. The movement of this mirror should be controlled so as appropriately position the mirror to reflect the injection beam toward the coupling prison 70 and to reflect the output beam away from the injection beam source.

Figure 5:
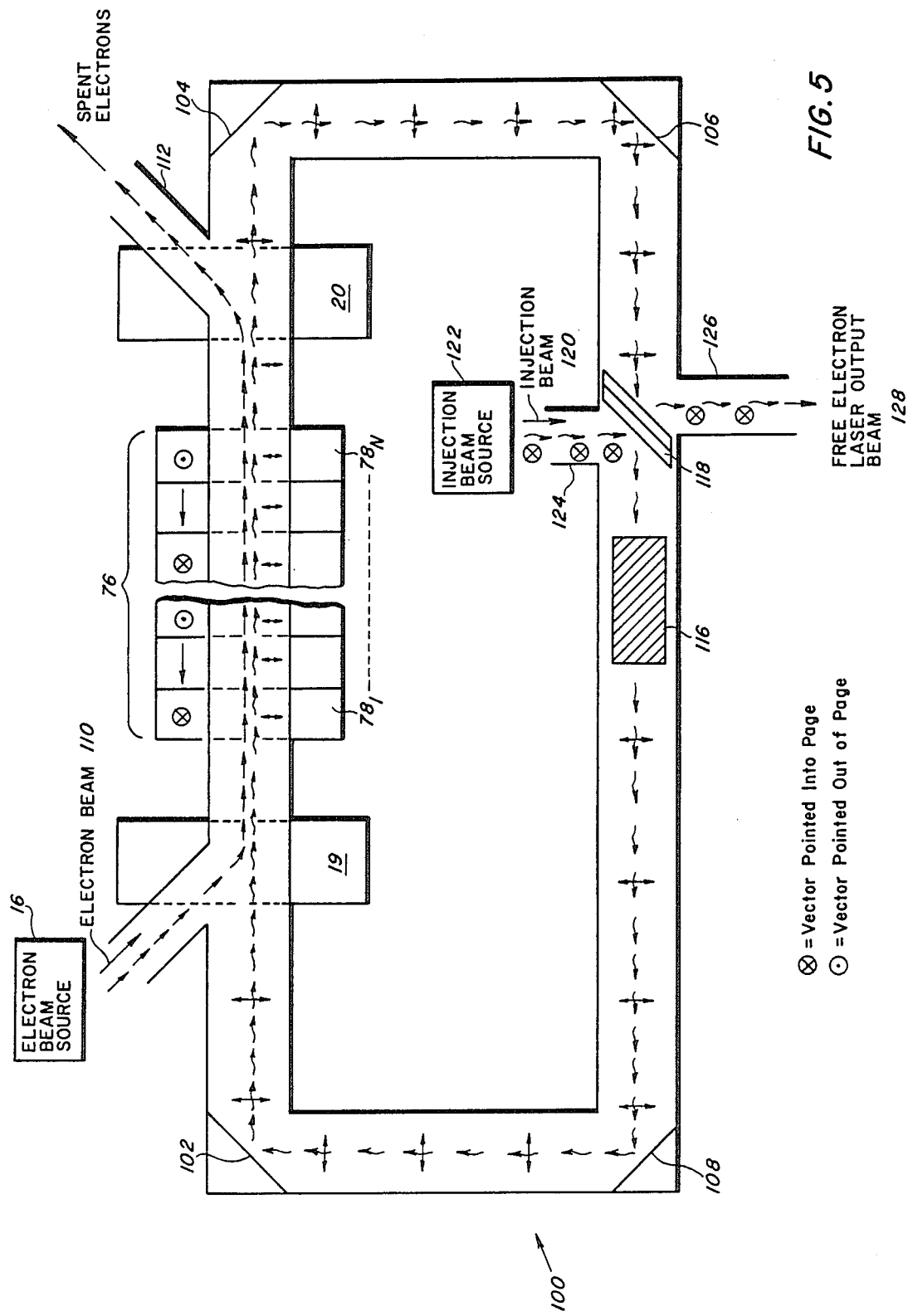
FIG. 5 illustrates a second preferred embodiment of the present Invention.

FIG. 5 illustrates a free-electron ring laser 100 according to another preferred embodiment of the present Invention. In FIG. 5 four laser quality mirrors 102, 104, 106 and 108 are arranged to form a stable resonant cavity.

A short-pulse electron beam source 16, such as an RF-linac or other electron accelerator, periodically supplies a relativistic beam 110 of macropulses of electrons which are deflected by a bending magnet 19 to propagate axially within the portion of the cavity bounded by the mirrors 102 and 104. After giving up energy to the free electron interaction, the spent electrons are deflected by a bending magnet assembly 20 and are removed from the cavity via an exit passage 112, as described above with respect to FIG. 2.

A wiggler magnet assembly 76 including a plurality of individual magnet structures $78_1$, through $78_N$, as described above with respect to FIGS. 2 and 3, is coaxially positioned about the portion of the cavity bounded by the mirrors 102 and 104. The wiggler magnet supples a spatially-periodic transverse magnetic field to the cavity.

The remaining portions of the cavity form a return path in which injected radiation and amplified radiation travel in a direction opposite to that of the electron beam 110; the radiation being returned to the mirror 102, the reflections from which travel along with the electron beam through the magnetic field produced by the wiggler magnet assembly 76.

An input/output system including a Pockels cell polarization rotator 116 and a Brewster stack polarization analyser 118 is located in the return path of the cavity. In FIG. 5, the Pockels cell and the Brewster stack are located between the mirrors 106 and 108; however, they could also be located between the mirrors 104 and 106 or between the mirrors 108 and 102. The Pockels cell 116 may be constituted in any well-known manner and must be sufficantly long to rotate the state of polarization of incident radiation by 90° without exceeding the maximum voltage limits of the cell material, as described above.

In operation, the Pockels cell 116 is energized and an injection beam of light 120 from a source 122 is directed onto the Brewster stack 118 through an input passage 124 in the cavity. The injection beam 120 is polarized normal to the plane of incidence (normal to plain of FIG. 5) as it strikes the Brewster stack 118 and thus is reflected into the cavity towards the Pockel cell 116. Being energized, the Pockel cell 116 rotates the polarization vector of the injection beam 120 by 90° (parallel to plane of FIG. 5). The rotated injection beam is then reflected by the mirror 108 and arrives at the mirror 102. The Pockel Cell 116 is then de-energized.

Subsequently macropulses of electrons in the electron beam 110 from the electron beam source 16 are injected into the cavity. The electron beam 110 and the injection beam 120 travel simultaneously through the magnetic field supplied by the wiggler magnet 76 wherein the free electron laser beam-wave interaction takes place. After passing through the wiggler magnetic field, the spent electron beam leaves the cavity via the exit passage 112, and the amplified light beam is reflected by the mirrors 104 and 106 onto the Brewster stack 118, arriving with its polarization vector lying in the plane of incedence. The light beam is thus transmitted by the Brewster stack, passes through the de-energized Pockels cell 116, is reflected by the mirror 108, and is reflected by the mirror 102 after which it meets a new macropulse of electrons arriving from the electron beam source 16. One or more of the mirrors 102, 104, 106, and 108 may be adjustable in a well known manner to control the time of arrival of the light beam to coincide with the arrival of the electron macropulse.

After the desired free electron amplification has occurred, the Pockels cell 116 is again energized. The polarization vector of the amplified light beam arriving from the Brewster stack 118 is rotated by 90° and the resultant rotated light beam traverses the cavity to arrive at the Brewster stack 118 polarized normal to the plane of incidence. The light beam is thus reflected by the Brewster stack and exits the cavity via an output passage 126 to form the free electron laser output beam 128 which then may be directed to its ultimate destination.

The ring laser of FIG. 5 may have the advantage of exhibiting higher gain than the linear cavity lasers of FIGS. 1 and 2. In the ring laser, the radiation in the cavity passes through to the Pockels cell polarization rotator 116 and the Brewster stack 118 once for each round trip about the cavity. On the other hand, in the linear cavity laser, the radiation passes through the Pockels cell 60 and its Brewster surfaces 66 and 68 twice during each round trip. Since these elements have unavoidable insertion losses, an obvious increase in gain is achieved by the ring laser.

In each of the preferred embodiments of the present Invention discussed above, Pockels cell polarization rotators providing 90° of polarization rotation were described. It should be understood that greater or lesser amounts of polarization rotation can be used with appropriate changes in the mechanical configuration of the laser device, as should be apparent to the skilled practitioner.

Also each of the preferred embodiments has been described using linear polarization. The present Invention can also be used with circular polarization, if obvious appropriate configuration changes are made.

Because the electron beam is the "laser medium" in the free electron laser, the free electron laser of the present Invention is inherently tunable. The wavelength of the output beam may be tuned by changing the energy of the electron beam and simultaneously by changing the wavelength of the injected light beam. Tuning could also be achieved by altering the magnetic field;

however, in most cases this is impractical due to the fact that the magnetic field is determined by the physical characteristics of the wiggler magnet assembly.

Numerous alternatives exist for the present Invention. For example, the cavity could be configured as an unstable resonator with the input light beam being injected through a hole or around the edge of one of the cavity's mirrors. The resonator design must be such that the output wave will not bounce out of the cavity until the electron beam macropulse is completed.

In another alternative embodiment, an excited laser medium is placed within the free electron laser cavity to fill the cavity with radiation prior to injection of the electron beam thereby achieving intercavity injection. For example, for operation at 16 microns a $CF_4$ gas cell operating under spontaneous or stimulated emission could be used. The injection laser gain medium may either be bleached out, saturated, or inactive during the free electron interaction.

In still another alternative embodiment, the end mirror 14 of the cavity shown in FIGS. 1 and 2 could be replaced with a time dependent semiconductor plate mirror of the type described by Alcock et al. in *Optics Communications* 18, Page 543, 1976. In this type of mirror, the semiconductor plate takes on mirror characteristics when irradiated by a ruby laser and is transparent when not irradiated. Thus, light beam injection and laser output extraction can occur through the semiconductor plate when it is transparent and the free electron laser interaction can occur when the plate is irradiated.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. A free electron laser comprising:
   a resonant optical cavity;
   wiggler magnet means for producing a spatially periodic magnet field in said cavity;
   means for injecting a beam of relativistic electrons into said cavity;
   means for injecting a polarized input optical beam into said cavity, said input optical beam and said electron beam interacting under the influence of said magnetic field to amplify said input optical beam, said input optical beam having a wavelength lying within the gain bandwidth of the free electron laser interaction, wherein said input optical beam injecting means includes source means for producing sai polarized optical beam; and
   optical switch means located within said cavity for controlling the transmission of said polarized optical beam into and out of said cavity, said transmitted polarized optical beam forming said input optical beam;
   wherein said input optical beam is polarized along a first polarization plane; and
   the magnetic field vectors of said spatially periodic magnetic field are oriented perpendicular to said first polarization plane.

2. The free electron laser as recited in claim 1, wherein said optical beam produced by said source means is polarized along a second polarization plane which forms an angle with respect to said first polarization plane and wherein said optical switch means comprises:
   polarization analyser means located along the optical axis of said cavity for receiving said polarized optical beam from said source means and for redirecting said polarized optical beam along the optical axis of said cavity; and
   polarization rotator means located along the optical axis of said cavity for receiving said polarized optical beam from said polarization analyer means and for rotating the state of polarization of said optical beam to lie along said first polarization plane.

3. The free electron laser as recited in claim 2, wherein:
   an output optical beam polarized along said first polarization plane is generated within said cavity;
   said polarization rotator means further includes means for receiving said output optical beam and for rotating the state of polarization of said output optical beam to lie along said second polarization plane; and
   said polarization analyser means further includes means for receiving said output optical beam from said polarization rotator means and for directing said output optical beam out of said cavity.

4. The free electron laser as recited in claim 1 wherein said optical switch means further includes:
   means for receiving an output optical beam generated within said cavity and for directing said output optical beam out of said cavity.

5. The free electron laser as recited in claim 1, wherein said cavity comprises a linear resonator.

6. The free electron laser as recited in claim 1, wherein said cavity comprises a ring resonator.

7. The free electron laser as recited in claim 1, wherein said means for injecting a beam of electrons comprises a short-pulse source of relativistic electrons.

8. The free electron laser as recited in claim 1, wherein said means for injecting a beam of electrons comprises an RF-linac.

9. The free electron laser as defined in claim 1, wherein said electrton beam injecting means includes means for injecting electrons in the form of macropulses; and
   wherein said optical switch means includes means for de-energizing said optical switch means after said optical beam is injected into said cavity to permit said optical beam to be reflected back and forth within said cavity, and for then energizing said optical switch means at the end of a given macropulse to thereby permit said optical beam to leave said cavity.

10. A free electron laser comprising:
    a resonant optical cavity;
    wiggler magnet means for producing a spatially periodic magnetic field in said cavity;
    means for injecting a beam of relativistic electrons into said cavity;
    means for injecting a polarized input optical beam into said cavity, said input optical beam and said electron beam interacting under the influence of said magnetic field to amplify said input optical beam, said input optical beam having a wavelength lying within the gain bandwidth of the free electron laser interaction, wherein said input optical beam injecting means includes source means for producing said polarized optical beam; and optical switch means located within said cavity for controlling the transmission of said polarized optical beam into and out of said cavity, said transmitted polarized optical beam forming said input optical beam;

wherein said input optical beam being polarized along a first polarization plane;

wherein magnetic field vectors of said spatially periodic magnetic field are oriented perpendicular to said first polarization plane;

output means for extracting an output optical beam from said laser.

11. The free electron laser as recited in claim 10, wherein said optical beam produced by said source means is polarized along a second polarization plane which forms an angle with respect to said first polarization plane and wherein said optical switch means comprises:

polarization analyser means located along the optical axis of said cavity for receiving said polarized optical beam from said source means and for redirecting said polarized optical beam along the optical axis of said cavity; and polarization rotator means located along the optical axis of said cavity for receiving said polarized optical beam from said polarization analyser means and for rotating the state of polarization of said optical beam to lie along said first polarization plane.

12. The free electron laser as recited in claim 11, wherein:

an output optical beam polarized along said first polarization plane is generated within said cavity;

said polarization rotator means further includes means for receiving said output optical beam and for rotating the state of polarization of said output optical beam to lie along said second polarization plane; and said polarization analyser means further includes means for receiving said output optical beam from said polarization rotator means and for directing said output optical beam out of said cavity.

13. The free electron laser as recited in claim 12, wherein said output optical beam is directed out of said cavity along an optical path joining said source means and said optical switch means, and wherein said output means comprises:

second polarization rotator means positioned along said optical path joining said source means and said optical switch means for receiving said polarized optical beam from said source means, for transmitting said optical beam to said optical switch means, for receiving said output optical beam from said polarization analyser means, and for rotating the state of polarization of said output optical beam to lie along a third plane of polarization; and second polarization analyser means positioned along said optical path and positioned between said source means and said second polarization rotator means for receiving said polarized optical beam from said source means, for transmitting said optical beam to said second polarization rotator means, for receiving said output optical beam from said second polarization rotator means, and for directing said output optical beam away from said optical path.

14. The free electron laser as recited in claim 11, wherein an output beam polarized along said first polarization plane is generated within said cavity, wherein said polarization rotator means further includes means for receiving said output optical beam and for rotating the state of polarization of said output optical beam to lie along said second polarization plane, and wherein said output means comprises:

second polarization analyser means located along said optical axis of said cavity for receiving said output optical beam from said polarization rotator means and for directing said output optical beam out of said cavity.

15. The free electron laser as defined in claim 10, wherein said electron beam injecting means includes means for injecting electrons in the form of macropulses; and wherein said optical switch means includes means for de-energizing said optical switch means after said optical beam is injected into said cavity to permit said optical beam to be reflected back and forth within said cavity, and for then energizing said optical switch means at the end of given macropulse to thereby permit said optical beam to leave said cavity.

16. A free electron laser comprising:

a resonant optical cavity;

wiggler magnet means for producing a spatially-periodic magnetic field in said cavity, wherein magnetic field vectors of said spatially periodic magnetic field are oriented perpendicular to said first polarization plane;

means for injecting a beam of relativistic electrons into said cavity;

means for injecting an input optical beam which is polarized along a first polarization plane into said cavity, said input optical beam and said electron beam interacting under the influence of said magnetic field to amplify said input optical beam to produce an output beam, said input optical beam having a wavelength lying within the gain bandwidth of the free electron laser interaction, wherein said input optical beam injecting means includes source means for producing said polarized optical beam; and optical switch means located within said cavity for controlling the transmission of said polarized optical beam into and out of said cavity, said transmitted polarized optical beam forming said input optical beam;

output means for extracting said output optical beam from said cavity.

17. The free electron laser as recited in claim 16, wherein said optical beam produced by said source means is polarized along a second polarization plane which forms an angle with respect to said first polarization plane and wherein said optical switch means comprises:

polarization analyser means located along the optical axis of said cavity for receiving said polarized optical beam from said source means and for redirecting said polarized optical beam along the optical axis of said cavity; and polarization rotator means located along the optical axis of said cavity for receiving said polarized optical beam from said polarization analyser means and for rotating the state of polarization of said optical beam to lie along said first polarization plane.

18. The free electron laser as recited in claim 17, wherein:

said output optical beam generated within said cavity is polarized along said first polarization plane;

said polarization rotator means further includes means for receiving said output optical beam and for rotating the state of polarization of said output optical beam to lie along said second polarization plane; and said polarization analyer means further includes means for receiving said output optical beam from said polarization rotator means and for directing said output optical beam out of said cavity.

19. The free electron laser as recited in claim 18, wherein said output optical beam is directed out of said cavity along an optical path joining said source means and said optical switch means, and wherein said output means comprises:

second polarization rotator means positioned along said optical path joining said source means and said optical switch means for receiving said polarized optical beam from said source means, for transmitting said optical beam to said optical switch means, for receiving said output optical beam from said polarization analyser means, and for rotating the state of polarization of said outut optical beam to lie along a third plane of polarization; and second polarization analyser means positioned along said optical path and positioned between said source means and said second polarization rotator means for receiving said polarized optical beam from said source means, for transmitting said optical beam to said second polarization rotator means, for receiving said output optical beam from said second polarization rotator means, and for directing said output optical beam away from said optical path.

20. The free electron laser as recited in claim 17, wherein said output optical beam generated within said cavity is polarized along said first polarization plane, wherein said polarization rotator means further includes means for receiving said output optical beam and for rotating the state of polarization of said output optical beam to lie along said second polarization plane, and wherein said output means comprises:

second polarization analyser means located along said optical axis of said cavity for receiving said output optical beam from said polarization rotator means and for directing said output optical beam out of said cavity.

21. The free electron laser as recited in claim 16, wherein said cavity comprises a linear resonator.

22. The free electron laser as recited in claim 16, wherein said cavity comprises a ring resonator.

23. The free electron laser as recited in claim 16, wherein said means for injecting a beam of a electrons comprises a short-pulse source of relativistic electrons.

24. The free electron laser as recited in claim 16, wherein said means for injecting a beam of electrons comprises an RF-linac.

* * * * *